United States Patent [19]

Brady

[11] 4,331,780
[45] May 25, 1982

[54] FLAME RETARDANT TRANSPARENT RESINOUS COPOLYMER

[75] Inventor: Donnie G. Brady, Bartlesville, Okla.

[73] Assignee: Phillips Petroleum Company, Bartlesville, Okla.

[21] Appl. No.: 132,198

[22] Filed: Mar. 20, 1980

[51] Int. Cl.$^3$ .............................................. C08K 5/35
[52] U.S. Cl. .................................................... 524/101
[58] Field of Search ................. 525/2, 6, 941, 98, 314; 260/DIG. 24, 30.6 R, 30.2, 45.7 PH

[56] References Cited

U.S. PATENT DOCUMENTS

| | | | |
|---|---|---|---|
| 3,039,991 | 6/1962 | Cooper | 260/DIG. 24 |
| 3,420,786 | 1/1969 | Weber et al. | 260/DIG. 24 |
| 3,441,524 | 4/1969 | Burger et al. | 260/DIG. 24 |
| 3,457,204 | 7/1969 | Burger et al. | 260/DIG. 24 |
| 3,472,799 | 10/1969 | Burger et al. | 260/DIG. 24 |
| 3,830,768 | 8/1974 | Martinez et al. | 260/DIG. 24 |
| 4,054,616 | 10/1977 | Miki | 525/314 |
| 4,086,192 | 4/1978 | Raley | 260/DIG. 24 |
| 4,140,660 | 2/1979 | Den Otter et al. | 260/DIG. 24 |
| 4,158,086 | 6/1979 | Hagen et al. | 260/DIG. 24 |
| 4,198,493 | 4/1980 | Marciandi | 260/DIG. 24 |

*Primary Examiner*—Paul R. Michl

[57] ABSTRACT

A flame retarded transparent resinous block copolymer comprising a transparent block copolymer containing about 50 to about 95 weight percent polymerized monovinyl aromatic compound and about 5 to about 50 weight percent polymerized conjugated diene and a flame retarding amount of a flame retardant selected from certain tris(bromoalkyl)phosphates or isocyanurates.

3 Claims, No Drawings

FLAME RETARDANT TRANSPARENT RESINOUS COPOLYMER

BACKGROUND OF THE INVENTION

This invention relates to flame retarded transparent resinous copolymer compositions.

It is well known in the art that transparent resinous copolymers can be obtained by polymerizing monovinylaromatic compounds and diene compounds. Successive polymerization of the monomers results in block copolymers of a linear structure. If such linear block copolymers are coupled to one another by a coupling agent containing more than two active coupling sites, a branched copolymer is obtained. Clear branched copolymers have been developed that are very commercially attractive because they are transparent and yet have high impact resistance.

For some applications of transparent resinous copolymers, it is desirable to render the copolymers flame resistant.

The use of flame-retardants in resinous compositions is well known in the art. Especially well known and useful prior art compositions include the combination of halogenated organic compounds and inorganic compounds, such as antimony trioxide, in the resinous compositions. The resultant compositions are well known in the art to have high degree of flame retardancy; however, they are likewise known to be quite opaque.

SUMMARY OF THE INVENTION

An object of this invention is to impart flame resistance to transparent resinous block copolymers while maintaining the desired transparency.

In accordance with this invention, there is provide a flame retarded transparent resinous copolymer comprising a transparent block copolymer containing about 50 to about 95 weight percent polymerized monovinyl aromatic compound and about 5 to about 50 weight percent polymerized conjugated diene and a flame retarding amount of a flame retardant selected from certain tris(bromoalkyl)phosphates and isocyanurates.

DETAILED DESCRIPTION

The present invention is applicable to any of the transparent resinous copolymers of the type above specified. The present invention is particularly preferred for the high impact branched resinous copolymers. Examples of methods of making such copolymers are disclosed in U.S. Pat. Nos. 3,639,517; 4,091,053; and 4,120,915, the disclosures of which are incorporated herein by reference. The present invention is also applicable to transparent compositions comprising blends of branched resinous copolymers such as disclosed in U.S. Pat. Nos. 4,080,407; and 4,104,326, the disclosures of which are also incorporated herein by reference.

The flame retardants useful for preparing the transparent compositions of this invention include those compounds having 6 to 21 carbon atoms and at least 3 bromine atoms per molecule and the formula $$[(C_nR_{2n+1})CH_2]_3Y$$

wherein R is hydrogen, methyl, ethyl, or bromine, n is an integer of from 1 to 5 and Y is selected from the group consisting of

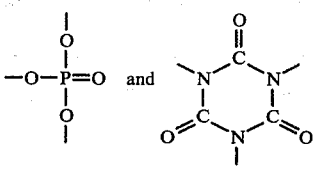

Examples of such suitable flame retardant materials for addition to the resinous block copolymers include tris(2-bromoethyl)phosphate, tris(2,3-dibromopropyl)phosphate, tris(2-bromopropyl)phosphate, tris(2,3,4-tribromobutyl)phosphate, tris(2,3-dibromo-2-methylpropyl)phosphate, tris(3-bromo-2-ethylbutyl)phosphate, tris(2-bromoethyl)isocyanurate, tris(2,3-dibromopropyl)isocyanurate, tris(2-bromoisopropyl)isocyanurate, tris(5,6-dibromohexyl)isocyanurate, and mixtures thereof.

The amount of flame retardant employed with the resinous block copolymers can vary widely depending, of course, on the nature of the flame retardant, the flammability of the original resinous block copolymer and the desired flammability of the resultant flame retarded composition. Generally, the inventive compositions will contain from about 1 to about 50 parts by weight of above-described flame retardant per 100 parts by weight of resinous block copolymer, and preferably from 3 to about 15 parts by weight flame retardant per 100 parts by weight resinous block copolymer.

With tris(2,3-dibromopropyl)phosphate as the flame retardant it is currently preferred to use about 10 to about 40 parts by weight of the phosphate per 100 parts by weight of the resinous block polymer. With tris(dibromopropyl)isocyanurate, it is currently preferred to use about 10 to about 20 parts by weight per hundred parts by weight of said copolymer.

Other well known suitable additives may be employed in the inventive compositions so long as such additives do not interfere with the transparency of the final composition. Such ingredients include stabilizers, antioxidants, lubricants, plasticizers, pigments, and the like and mixtures thereof.

The above-described flame retardant and other optional additives can be incorporated into the resinous block copolymer by any means which are well known in the art, such as hot-mixing or solution blending.

The aspects of this invention and its advantages over the prior art are illustrated by the following example.

EXAMPLE

In this example, a series of known flame retardants were combined with a commercial resinous branched block copolymer sold by Phillips Petroleum Company as KRO3 type K-Resin ® polymer, K-Resin is a trademark of Phillips Petroleum Company. The copolymer is a 75/25 styrene/1,3-butadiene branched copolymer product in accordance with a method described in the aforementioned U.S. Pat. No. 3,639,517. Each flame retardant was mixed with the copolymer in a mill at 138° C. The mixed compositions were then molded into slabs (6.35 cm×10.16 cm×3.18 mm) at 177° C. The molded slabs were inspected for transparency and were tested for Oxygen Index according to ASTM D 2863. The results are recorded in the following Table.

TABLE

| Run No. | | Additive | Amt php[1] | Appear. | Oxygen Index[8] |
|---|---|---|---|---|---|
| 1 | (Comp.) | None | 0 | Clear | 18.8 |
| 2 | (Inv.) | Tris(2,3-bromopropyl)phosphate[2] | 10 | Clear | 22.0 |
| 3 | (Inv.) | " | 13.3 | Clear | 21.0 (21.6) |
| 4 | (Inv.) | " | 20 | Clear | 24.4 (22.9) |
| 5 | (Inv.) | " | 30 | Clear | 24.4 |
| 6 | (Inv.) | " | 40 | Clear | 25.5 |
| 7 | (Inv.) | Tris(dibromopropyl)isocyanurate | 5 | Hazy | 19.8 |
| 8 | (Inv.) | " | 10 | Clear | 21.6 (22.2) |
| 9 | (Inv.) | " | 13.3 | Clear | 23.3 |
| 10 | (Inv.) | " | 20 | Clear | 23.3 (24.4) |
| 11 | (Inv.) | " | 30 | Partly Hazy | 24.6 |
| 12 | (Comp.) | Hexabromobiphenyl[3] | 5 | Clear | 19.2 |
| 13 | (Comp.) | " | 10 | Clear | 19.6 |
| 14 | (Comp.) | Tris(1,3-dichloro-2-propyl)phosphate[4] | 10 | Clear | 20.2 |
| 15 | (Comp.) | " | 13.3 | Clear | 20.0 |
| 16 | (Comp.) | " | 20 | Clear | 20.8 |
| 17 | (Comp.) | Pentabromoethylbenzene | 5 | Clear | 19.6 |
| 18 | (Comp.) | " | 10 | Clear | 20.2 |
| 19 | (Comp.) | Decabromodiphenyl ether | 13.3 | White | 20.8 |
| 20 | (Comp.) | " | 20 | White | 21.6 |
| 21 | (Comp.) | Chlorinated paraffin[5] | 13.3 | Clear & Yellow | 20.2 |
| 22 | (Comp.) | " | 20 | Clear & Yellow | 20.4 |
| 23 | (Comp.) | Chlorinated polycyclic[6] | 15 | White | 19.4 |
| 24 | (Comp.) | Chlorinated polycyclic[7] | 15 | Hazy | 21.6 |

[1] Parts by weight per 100 parts by weight of polymer.
[2] Firemaster T23P (Michigan Chemical Corp.).
[3] Firemaster BP6 (Michigan Chemical Corp.).
[4] Firemaster T33P (Michigan Chemical Corp.).
[5] Chlorowax 70 (Diamond Shamrock Chemical Co.).
[6] Dechlorane Plus (Hooker Chemical Corp.).
[7] Dechlorane 604 (Hooker Chemical Corp.).
[8] Oxygen Index is defined in D 2863 as the minimum concentration of oxygen (expressed in volume percent) in a mixture of oxygen and nitrogen that will just support flaming combustion of a test specimen. Thus, higher numbers are indicative of greater flame resistance.

The data in the above table show that use of tris(2,3-dibromopropyl)phosphate and tris(dibromopropyl)isocyanurate in resinous butadiene/styrene block copolymer results in compositions which are transparent and exhibit improved flame resistance compared to compositions containing other known halogenated flame retardants which compositions are deficient in transparency or in flame resistance.

What is claimed is:

1. A flame retarded transparent resinous block copolymer composition comprising a transparent block copolymer containing about 50 to about 95 weight percent polymerized monovinyl aromatic compound and about 5 to about 50 weight percent polymerized conjugated diene and a flame retarding amount of flame retardant wherein all said flame retardant is tris-(dibromopropyl)isocyanurate.

2. A composition according to claim 1 wherein said flame retardant is present in an amount in the range of about 10 to about 20 parts by weight per 100 parts by weight of said copolymer.

3. A composition according to claim 2 wherein said block copolymer is a resinous branched block copolymer containing about 75 percent polymerized styrene and about 25 percent polymerized butadiene.

* * * * *